United States Patent [19]

Mori

[11] Patent Number: 5,089,821

[45] Date of Patent: Feb. 18, 1992

[54] DIGITAL DATA REPRODUCING CIRCUIT FOR A MAGNETIC RECORDING APPARATUS OF REPRODUCING DIGITAL DATA WITHOUT BEING AFFECTED BY CAPABLE EXTERNAL NOISE, DROP-INS, AND DROP-OUTS

[75] Inventor: Kunitaka Mori, Tokyo, Japan

[73] Assignee: NEC Corporation, Japan

[21] Appl. No.: 358,956

[22] Filed: May 30, 1989

[30] Foreign Application Priority Data

May 28, 1988 [JP] Japan .................................. 63-129452
Jun. 27, 1988 [JP] Japan .................................. 63-158743
Sep. 7, 1988 [JP] Japan .................................. 63-222291
Sep. 7, 1988 [JP] Japan .................................. 63-222292

[51] Int. Cl.$^5$ ........................ H03M 1/12; G11B 5/09
[52] U.S. Cl. .................................. 341/155; 360/53; 360/51
[58] Field of Search ............. 360/51, 53, 46; 369/59, 369/60; 371/6, 31, 65; 341/155

[56] References Cited

U.S. PATENT DOCUMENTS 3,821,716 6/1974 Ghajar .................................. 371/6
3,877,025 4/1975 Maio .................................. 307/360
4,626,933 12/1986 Bucska et al. .................................. 360/51

Primary Examiner—Aristotelis Psitos
Assistant Examiner—Won Tae C. Kim
Attorney, Agent, or Firm—Ostrolenk, Faber, Gerb & Soffen

[57] ABSTRACT

A digital data reproducing circuit suitable for use with a magnetic-recording apparatus comprises first and second comparators, a clock-generating circuit, first and second shift registers, and a discriminator. The first comparator determines when a positive amplitude of a reproduced analog signal exceeds a positive first level. The second comparator determines when a negative amplitude of the reproduced analog signal exceeds a negative first level. The clock generating circuit generates a clock signal phased-locked to timings of positive and negative peaks of the reproduced analog signal. The first shift register receives an output of the first or second comparator in response to the clock signal and shifts and stores such output. The second shift register receives an OR signal of outputs of the first and second comparators in response to the clock signal and shifts and stores such OR signal. The discriminator produces digital data from parallel outputs of the first and second shift registers.

4 Claims, 9 Drawing Sheets

FIG. 1a. (PRIOR ART)
(RECORDED DATA) 1 1 0 0 1 1

FIG. 3a.
(RECORDED DATA) 1 0 0 1 0 0 0 1 0 1

← 1 BIT CELL

FIG. 4a.

| | $b_0$ | $b_1$ | $b_2$ | $b_3$ | $b_4$ | $b_5$ | $b_6$ | $b_7$ | $b_8$ | $b_9$ | $b_{10}$ |
|---|---|---|---|---|---|---|---|---|---|---|---|
| (2ND) | L | H | H | H | H | L | L | H | H | L | H |

FIG. 4b.

| | $b_0$ | $b_1$ | $b_2$ | $b_3$ | $b_4$ | $b_5$ | $b_6$ | $b_7$ | $b_8$ | $b_9$ | $b_{10}$ |
|---|---|---|---|---|---|---|---|---|---|---|---|
| (1ST) | L | H | H | H | L | L | L | L | H | L | L |

FIG. 4c. "0" "1" "0" "0" "1" "0" "0" "0" "1" "0" "1"

FIG. 5a.
(RECORDED DATA) 1 0 1 0 0 0 1 0 0 1 0

← 1 BIT CELL

FIG. 6a.

|      | $b_0$ | $b_1$ | $b_2$ | $b_3$ | $b_4$ | $b_5$ | $b_6$ | $b_7$ | $b_8$ | $b_9$ | $b_{10}$ |
|------|---|---|---|---|---|---|---|---|---|---|---|
| (2ND) | H | L | H | H | L | L | H | H | H | H | L |

FIG. 6b.

|      |   |   |   |   |   |   |   |   |   |   |   |
|------|---|---|---|---|---|---|---|---|---|---|---|
| (1ST) | L | L | H | L | L | L | L | H | H | H | L |

(RECORDED DATA)
1 0 0 1 0 0 1 1 1 0 0 1 1

FIG. 12a.
(RECORDED DATA)
1 0 0 1 0 0 1 1 1 0 0 1 1 1

DIGITAL DATA REPRODUCING CIRCUIT FOR A MAGNETIC RECORDING APPARATUS OF REPRODUCING DIGITAL DATA WITHOUT BEING AFFECTED BY CAPABLE EXTERNAL NOISE, DROP-INS, AND DROP-OUTS

BACKGROUND OF THE INVENTION

The present invention relates to a digital magnetic-recording apparatus and, more particularly, to a digital data reproducing circuit for use in a digital magnetic-recording apparatus.

A recording apparatus of the type using a magnetic disk, magnetic tape or similar magnetic recording medium, reproduces stored digital data in the form of an analog waveform representative of transitions of magnetic polarity on the recording medium. In the case of data recorded by an NRZI (non-return-to-zero) modulation system, for example, a data "1" is representative of a positive or a negative peak of the reproduced waveform. A digital data reproducing circuit, therefore, differentiates the reproduced waveform and determines the points where the differentiated waveform crosses a zero level representative of zero AC volts, to detect the peaks.

When a recording medium has a magnetic defect such as a change in the density of the magnetic powder or when electrical noise is introduced in a playback system from outside the system, false data generally referred to as a "drop-in" and the omission of data generally referred to as a "drop-out" can occur. To eliminate such occurrences, it has been customary with conventional data reproducing circuits to detect the absolute amplitudes of a reproduced analog waveform and to convert, among the above-mentioned peaks, only the peaks having amplitudes higher than a predetermined threshold level into digital signals, determining that they are data "1".

However, the conventional data reproducing circuits have a critical drawback that when external noise whose amplitude exceeds the threshold level is introduced in the reproduced analog signal, the circuits translate even the noise into data "1".

SUMMARY OF THE INVENTION

It is, therefore, an object of the present invention to provide a data reproducing circuit capable of reproducing digital data accurately.

It is another object of the present invention to provide a data reproducing circuit capable of reproducing digital data accurately without being affected by external noise.

A data reproducing circuit of the present invention comprises: a first comparator for determining that a positive amplitude of a reproduced analog signal exceeds a positive first level; a second comparator for determining that a negative amplitude of the reproduced analog signal exceeds a negative first level; a clock generating circuit for generating a clock signal phase-locked to timings of positive and negative peaks of the reproduced analog signal; a first shift register for taking in an output of the first comparator or second comparator in response to the clock signal to shift and store the output; a second shift register for taking in an OR signal of outputs of the first comparator and the second comparator in response to the clock signals to shift and store the OR signal; and a discriminator for producing digital data from outputs of the first and second shift registers.

BRIEF DESCRIPTION OF THE DRAWINGS

The above and other objects, features and advantages of the present invention will become more apparent from the following detailed description when taken with the accompanying drawings in which.

DESCRIPTION OF THE PREFERRED EMBODIMENTS

To better understand the present invention, a brief reference will be made to a conventional digital data reproducing circuit for a magnetic storing apparatus.

Figures 1A, 1B:
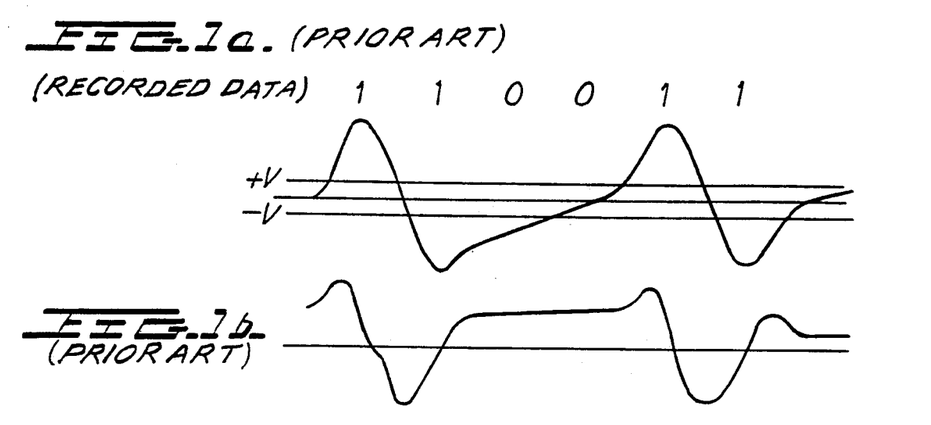
FIGS. 1a–1h plots waveforms useful for understanding the operation of a conventional data reproducing circuit.
Figure 1C:
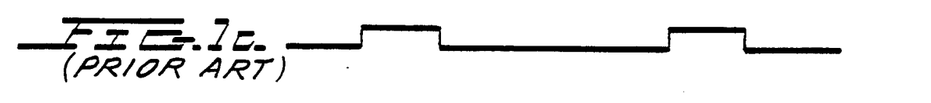

Referring to FIGS. 1a–1h of the drawings, data recorded in a magnetic tape or a magnetic disk by an NRZ signal as transitions of magnetic polarity are reproduced by an inductive head in the form of an analog waveform (FIG. 1a). A digital data reproducing circuit differentiates the reproduced waveform to produce a differentiated signal having a waveform shown in FIG. 1b. Comparing the differentiated signal with a zero level line which is representative of AC zero volt, the reproducing circuit generates a digital peak detection signal as shown in FIG. 1c.

Figure 1D:
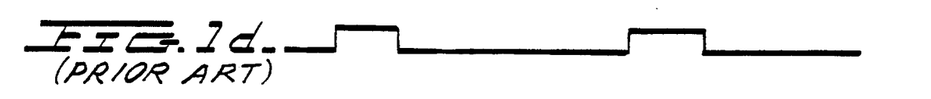
Figure 1E:
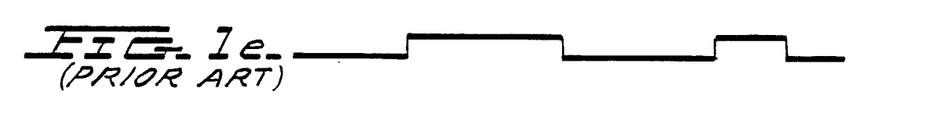
Figure 1F:
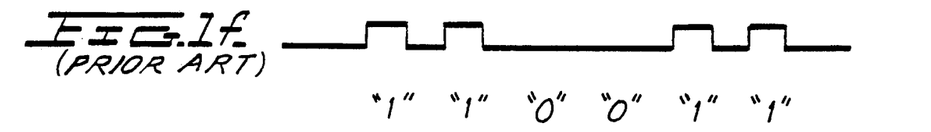

When a magnetic recording medium has a magnetic defect such as a change in the density of magnetic powder or when electrical noise is introduced in a playback system from outside the system, there occurs false data usually called "drop-in", or the omission of data usually called "drop-out". In the light of this, the conventional reproducing circuit compares the amplitudes of the reproduced analog signal (FIG. 1a) with threshold levels $+V$ and $-V$ to output a positive and a negative detection signals as shown in FIGS. 1d and 1e, respectively. The reproduced digital data signal (FIG. 1f) are such that data "1" appears when the positive or negative detection signal (FIG. 1d or 1e) has a high level at any of the positive- and negative-going edges of the peak detection signal (FIG. 1c).

Figures 1G, 1H:
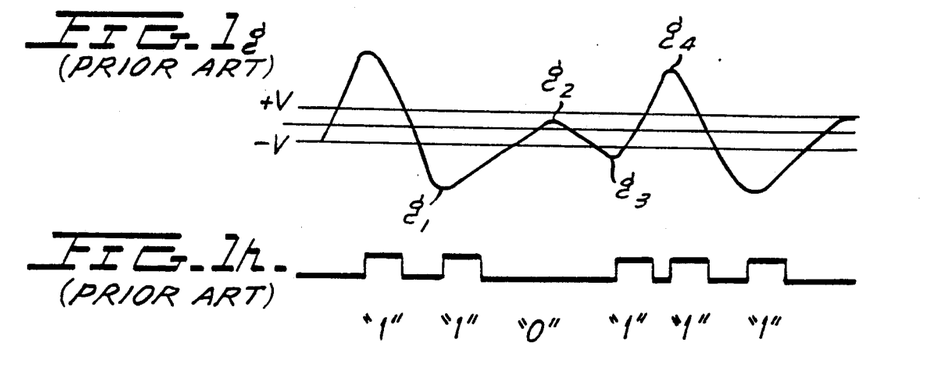

When externally derived noises $g_2$ and $g_3$ are superposed on the reproduced analog signal (FIG. 1a), the reproduced signal changes as shown in FIG. 1g. While the noise $g_2$ does not exceed the threshold level $+V$, the noise $g_3$ does exceed the threshold level $-V$. A problem with the prior art reproducing circuit is that it translates such a noise $g_3$ into data "1" and thereby produces a false digital signal, as shown in FIG. 1h.

Figure 2:
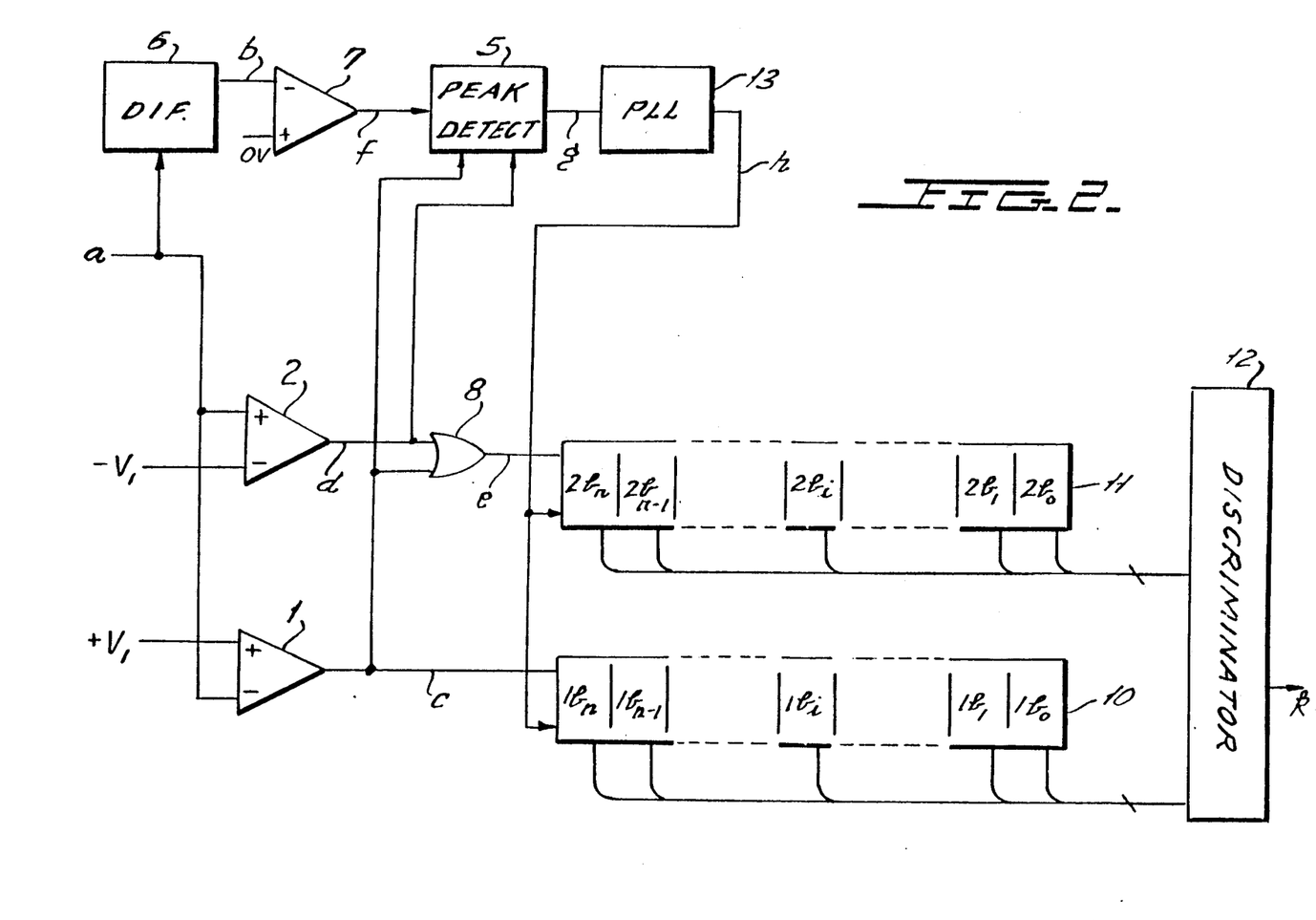
FIG. 2 is a schematic block diagram showing a first embodiment of the present invention.

Referring to FIG. 2, a digital data reproducing circuit embodying the present invention is shown and includes first and second comparators 1 and 2, respectively. The first comparator 1 produces a high level "H" when a reproduced analog signal a has a positive amplitude higher than a first positive threshold level $+V_1$, while the second comparator 2 produces "H" when the analog signal a has an amplitude lower than a negative threshold level $-V_1$. The outputs of the first and second comparators 1 and 2 are connected to the inputs of a peak detector 5. A differentiator 6 electrically differentiates the reproduced analog signal a. A third comparator produces "H" when the differentiated output of the differentiator 6 is positive. The output of the third comparator 7 is also connected to the peak detector 5. The output of the peak detector 5 is coupled to a phase-locked loop circuit (PLL) 13.

The outputs of the first and second comparators 1 and 2 are fed to an OR gate 8. Each of first and second shift registers 10 and 11 are implemented as a serial-in parallel-out shift register. The first shift register 10 has a serial input connecting to the first comparator 1, while the second shift register 11 has a serial input connecting to the second comparator 2. The PLL 13 outputs clock signal h the phase and frequency of which are synchronous to an output of the peak detector 5. The output of the PLL 13 is connected to shift clock inputs of the first and second shift registers 10 and 11. Parallel outputs of the shift registers 10 and 11 are connected to a data discriminator 12 which produces reproduced digital data k.

The bit length required of each of the shift registers 10 and 11 is more than the largest interval between consecutive data "1" produced by coding, plus 1 (one). In the above-stated recording system, for example, since the number of bits in which "0" continuously appears is three at maximum, the required bit length of the shift registers 10 and 11 is five or more bits.

Reference will be made to FIGS. 3a-3h and 5a-5h for describing how data recorded in a magnetic tape by an ANSI X3B5 recording system are read out by the circuitry of FIG. 2 with the tape being driven in the forward and reverse directions, respectively.

The first comparator 1 produces a positive level detection signal c by detecting the portions of the reproduced analog signal a which are higher than the positive level $+V_1$. The second comparator 2 produces a negative level detection signal d by detecting the portions of the signal a which are lower than the negative level $-V_1$. The OR gate 8 OR the outputs of the comparators 1 and 2 to output an OR signal e. The differentiator 6 transforms the reproduced signal a into an analog differentiated signal b. The third comparator 7 produces a differentiated level detection signal f by comparing the signal b with zero volt.

The peak detector 5 monitors the positive and negative level signals c and d at the positive-going and negative-going edges of the differentiated level detection signal f. When any of the signals c and d has a level "H", the peak detector 5 outputs a level "H" having a predetermined pulse width to thereby produce a peak detection signal g. Hence, the positive-going edges of the peak detection signal g are representative of the timings of the positive and negative peaks of the reproduced signal a. Receiving the peak signal g, the PLL 13 generates the clock signal h whose positive-going edges are phase-locked to those of the peak signal g.

Figure 3A:
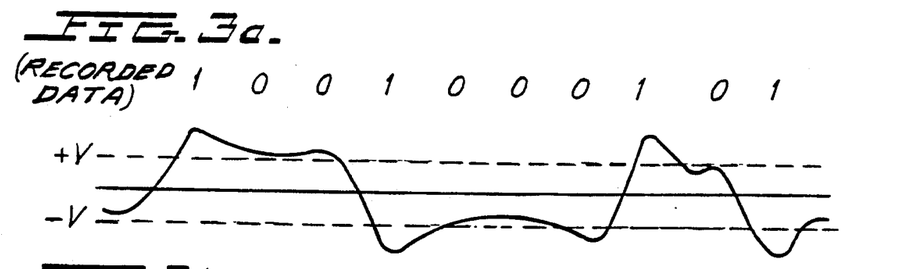
FIGS. 3a–3h and 5a–5h are timing charts demonstrating the operation of the first embodiment shown in FIG. 2.
Figure 3B:
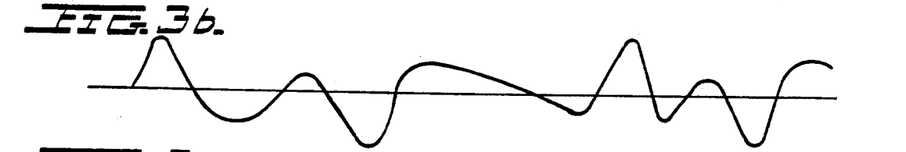
Figure 3C:
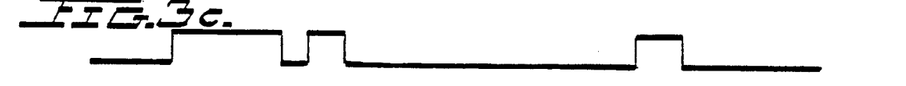
Figure 3D:
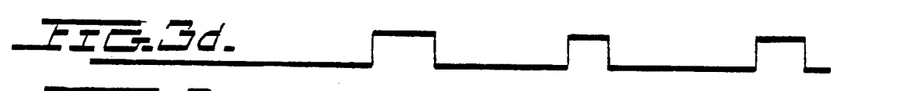
Figure 3E:
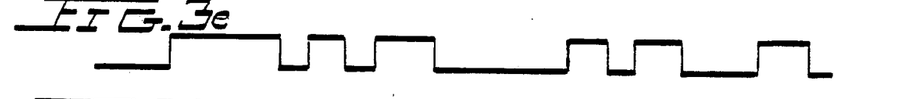
Figure 3F:
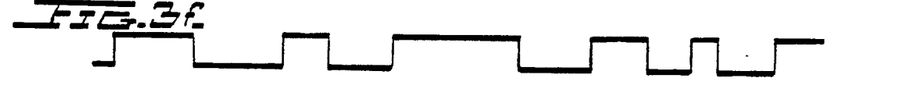
Figure 3G:
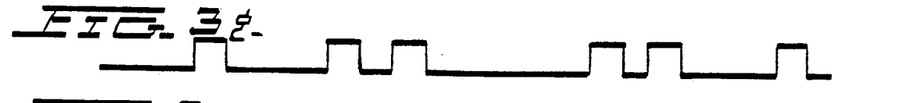
Figure 3H:
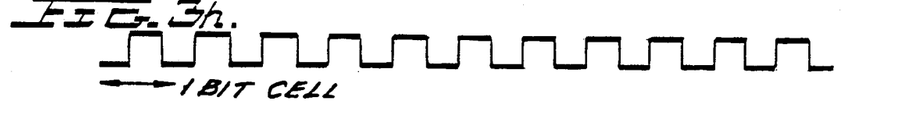

One period of the clock signal h defines one bit cell, and each of the times of the positive-going edges of the clock signal h is representative of the center of a bit cell. Data produced by sampling the positive level signal c and OR signal e at the positive-going edges of the clock signal h are sequentially stored in the shift registers 10 and 11, respectively. Specifically, the positive level detection signal c is stored in the first shift register 10 at the positive-going edges of the clock h while being sequentially shifted. The data stored in the shift register 10 shows that the reproduced signal a has a positive peak in the associated bit cell. On the other hand, the OR signal e (OR of the positive level and negative level signals c and d) is stored in the second shift register 11 at the positive-going edges of the clock h while being sequentially shifted. The data stored in the shift register 11 indicates whether or not the signal a has a positive or negative peak exceeding the threshold level $+V_1$, or $-V_1$ in the associated bit cell.

Figure 4A:
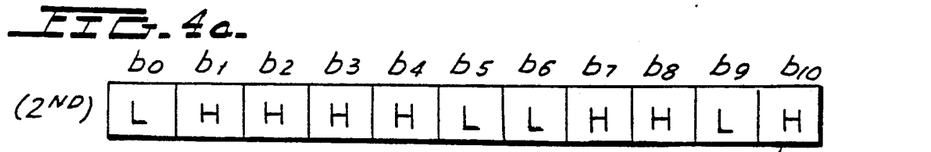
FIGS. 4a–4c and 6a–6c are diagrams useful for understanding the operation of a data discriminator shown in FIG. 2.
Figure 4B:
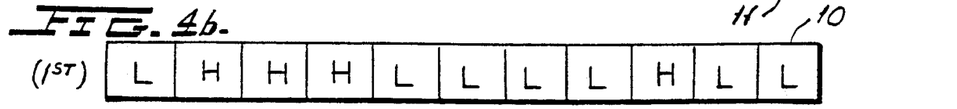
Figure 4C:
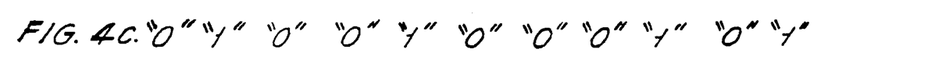
Figure 5A:
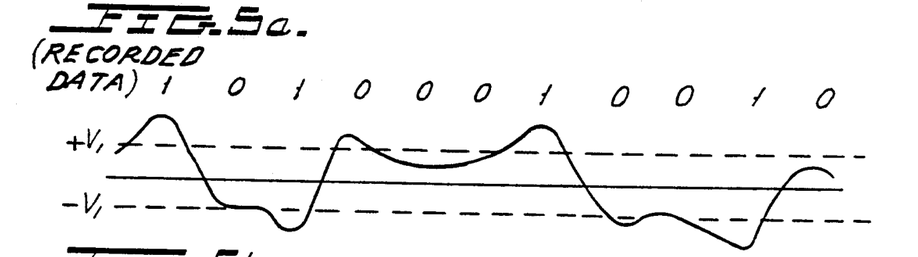
Figures 5B, 5C, 5D:
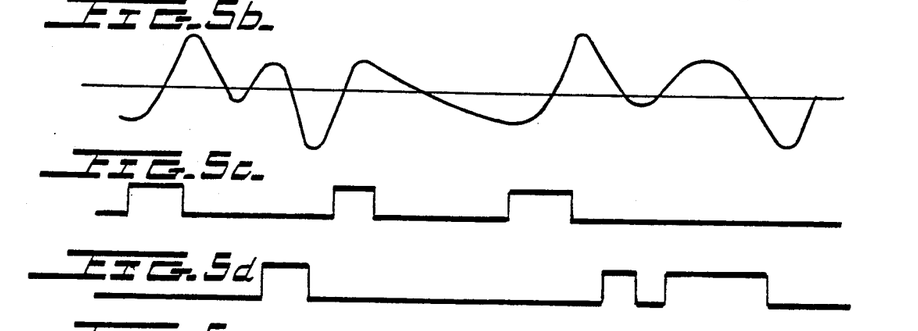
Figure 5E:
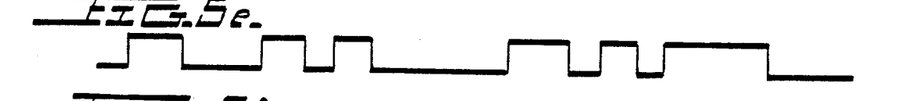
Figure 5F:
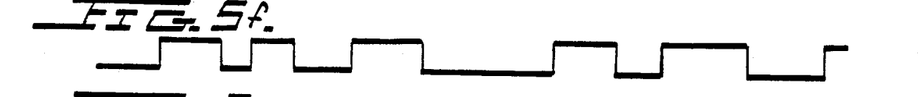
Figure 5G:
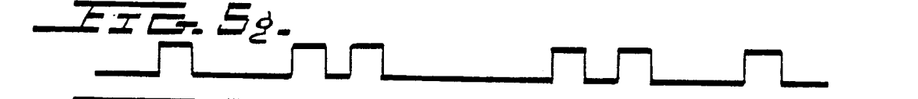
Figure 5H:
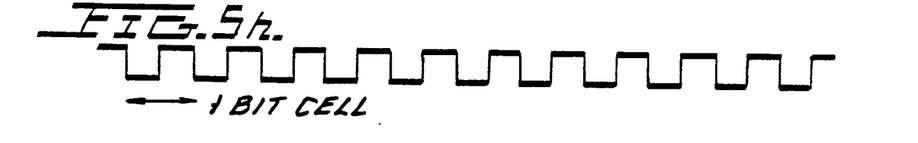

As FIG. 4 indicates, when the magnetic tape is driven in the forward direction, the level signals are stored in the first and second shift registers 10 and 11 while being sequentially shifted in bit positions $b_0$, $b_1$, $b_2$ and so forth in this order. In this case, therefore, the level signal in the bit position $b_{10}$ is the level signal stored last with respect to time. When the content of the second shift register 11 is a low level "L", the data discriminator 12 determines that the bit cell is data "0".

The description proceeds with attention paid to the bit $b_4$ as a target bit by way of example. In a reproduced waveform associated with the ANSI X3B5 recording system, the first peak appearing after a previous peak whose polarity is reverse to the first peak corresponds to data "1" during forward playback. The data discriminator 12 detects, on the basis of the content of bit (second target bit cell) $2b_4$ of the shift register 11, that a candidate representative of a peak having an amplitude exceeding the threshold level $+V_1$ or $-V_1$, i.e., data "1" exists in the associated bit cell (target bit cell) $b_4$. The data discriminator 12 also knows, on the basis of the content of bit (first target bit cell) $1b_4$ of the shift register 10, that the peak in that bit cell $b_4$ has negative polarity.

To determine whether or not the above-mentioned peak is data "1" or "0", the data discriminator 12 checks the bits of the first and second shift registers 10 and 11 which precede the bit $b_4$, i.e., the bits $2b_3$ to $2b_0$ of the second register 11 to find a particular bit as a reference bit which has a level "H" and is closest to the target bit $b_4$ with respect to time. Then, the data discriminator 12 determines the polarity of the particular bit by referencing the content of the first shift register 10, i.e., whether or not it is opposite to the polarity of the bit (first target bit cell) $1b_4$. If the bit of interest, i.e., first reference bit cell, is opposite in polarity to the bit $1b_4$, the data discriminator 12 determines that the target bit $b_4$ is data "1"; if otherwise, it determines that the target bit $b_4$ is data "0". More specifically, among the bits $2b_3$ to $2b_0$ of the second shift register 11, the bits $2b_3$, $2b_2$ and $2b_1$ have a level "H" and it is the bit (second reference bit cell) $2b_3$ that is closest to the bit $2b_4$ with respect to time. The bit (first reference bit cell) $1b_3$ of the second shift register 11 associated with the bit $2b_3$ has a level "H" which is opposite to the polarity of the bit (first target bit cell) $1b_4$. Hence, the data discriminator 12 determines that the target bit $b_4$ is data "1".

Next, concerning a target bit $b_7$ which has a level "H" in a second target bit cell $2b_7$ in the second register 11. Whether it corresponds to the data "1" or "0" is determined on the basis of the contents of the bits $b_3$, $b_4$, $b_5$ and $b_6$ of the first and second shift registers 10 and 11. The content of the bit (first target bit cell) $1b_7$ of the first register 10 indicates that the peak of the reproduced analog signal a existing in this bit cell has negative polarity. The contents of the second register 11 show that the bit (second reference bit cell) $2b_4$ is the bit which has a level "H" and closest to the bit $2b_7$ (second target bit cell) and, therefore, the bit $b_4$ is regarded as a reference bit. Further, the content of the bit (first reference bit cell) $1b_4$ of the first register 10 shows that the peak of the signal a existing in this bit cell has negative polarity. Since the bits have the same polarity, it is determined that the target bit $b_7$ is data "0". By the same procedure, it is determined that the bit $b_8$ is data "1" and that the bit $b_{10}$ is data "0".

Figure 6A:
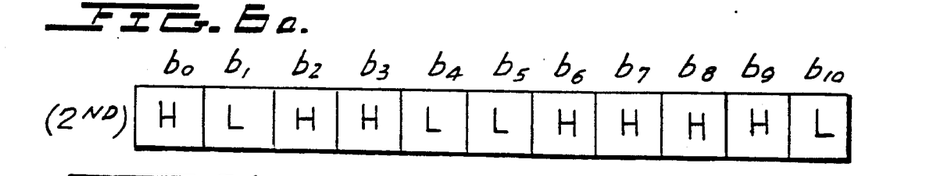
Figure 6B:
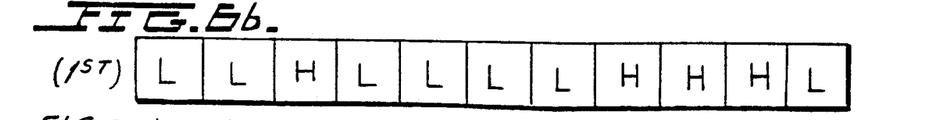
Figure 6C:
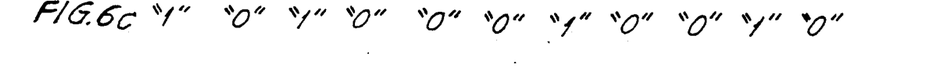

FIGS. 6a-6c indicate the procedure for reproducing the digital data k out of the analog signal a by driving the magnetic tape reproduced in the reverse direction. As shown in FIG. 5, the analog signal a produced by the reverse playback has a waveform opposite to the waveform of FIG. 3 with respect to time and amplitude, due to the magnetism reciprocity principle. The waveform associated with the reverse playback, contrary to the waveform associated with the forward playback, is such that the last peak of the same polarity after a peak whose polarity is reverse to the last peak corresponds to data "1", due to the magnetism reciprocity principle. Concerning the bit $b_0$, for example, the data discriminator 12 recognizes that a peak whose amplitude exceeds $+V_1$ or $-V_1$ exists in the signal a within the bit cell $b_0$, on the basis of the content of a bit $2b_0$ of the second shift register 11. The data discriminator 12 also determines that the peak existing in the bit cell $b_0$ has positive polarity, based on the content $1b_0$ of the first register 10.

To see if the peak in the bit $b_0$ is data "1" or "0", the data discriminator 12 checks the bits $b_1$, $b_2$, $b_3$ and $b_4$ of the shift registers 10 and 11 which follow the bit $b_0$ of interest, i.e., it searches for particular one of the bits $2b_1$ to $2b_4$ which has a level "H" and is closest to the bit $b_0$ with respect to time. Then, the data discriminator 12 references the content of the first register 10 to determine the polarity of the peak of the particular bit. If the determined polarity is opposite to the polarity of the bit $1b_0$, the data discriminator 12 regards the bit $b_0$ as data "1"; if otherwise, it regards the bit $b_0$ as data "0". More specifically, among the bits $2b_1$ to $2b_4$ of the second shift register 11, the bits $2b_2$ and $2b_3$ have a level "H", and it is the bit $2b_2$ that is closest to the bit $2b_0$. The bit $1b_2$ of the first register 10 which corresponds to the bit $2b_2$ has a level "H" which is opposite in polarity to the bit $1b_0$. Consequently, the data discriminator 12 determines that the bit $b_0$ is data "1". In the same manner, it determines that the bit $b_2$ is data "1".

Whether the bit $b_3$ corresponds to data "1" or "0" is dependent on the contents of the bits $b_4$, $b_5$, $b_6$ and $b_7$ of the shift registers 10 and 11. The content of the bit $1b_3$ of the first register 10 indicates that the peak of the signal a existing in this bit cell $b_3$ has negative polarity. The contents of the bits $2b_4$ to $2b_7$ of the second register 11 show that the bit having a level "H", and closest to the bit $2b_3$, is the bit $b_6$. Further, the content of the bit $1b_6$ of the first register 10 shows that the peak of the signal a existing in this bit cell $b_6$ has a peak of negative polarity. Since the bits $1b_3$ and $1b_6$ have the same polarity, it is determined that the bit $b_3$ is data "0". By the same procedure, the bits $b_6$ and $b_9$ are determined to be data "1" and the bit $b_7$ and $b_8$ are data "0", respectively.

The data discriminator 12 may be implemented by a microprocessor capable of performing the above operations. If desired, the data discriminator 12 may be provided with a table individually associated with the bits of the first and second shift registers 10 and 11, and may be so constructed to determine that a bit $b_i$ is data "1" when any of the combinations shown in Table 1 is satisfied. In such a case, the data discriminator 12 may be constituted by a ROM or a programmable logic array for implementing rapid data discrimination.

TABLE 1

|  | 2ND REGISTER 11 | | | | | 1ST REGISTER 10 | | | | |
| --- | --- | --- | --- | --- | --- | --- | --- | --- | --- | --- |
|  | $2b_{i-4}$ | $2b_{i-3}$ | $2b_{i-2}$ | $2b_{i-1}$ | $2b_i$ | $1b_{i-4}$ | $1b_{i-3}$ | $1b_{i-2}$ | $1b_{i-1}$ | $1b_i$ |
| FORWARD PLAYBACK |  |  |  | H | H |  |  |  | L | H |
|  |  |  |  | H | H |  |  |  | H | L |
|  |  |  | H | L | H |  |  | L |  | H |
|  |  |  | H | L | H |  |  | H |  | L |
|  |  | H | L | L | H |  | L |  |  | H |
|  |  | H | L | L | H |  | H |  |  | L |
|  | H | L | L | L | H | L |  |  |  | H |
|  | H | L | L | L | H | H |  |  |  | L |

|  | $2b_i$ | $2b_{i+1}$ | $2b_{i+2}$ | $2b_{i+3}$ | $2b_{i+4}$ | $1b_i$ | $1b_{i+1}$ | $1b_{i+2}$ | $1b_{i+3}$ | $1b_{i+4}$ |
| --- | --- | --- | --- | --- | --- | --- | --- | --- | --- | --- |
| REVERSE PLAYBACK | H | H |  |  |  | H | L |  |  |  |
|  | H | H |  |  |  | L | H |  |  |  |
|  | H | L | H |  |  | H |  | L |  |  |
|  | H | L | H |  |  | L |  | H |  |  |
|  | H | L | L | H |  | H |  |  | L |  |
|  | H | L | L | H |  | L |  |  | H |  |
|  | H | L | L | L | H | H |  |  |  | L |
|  | H | L | L | L | H | L |  |  |  | H |

Figure 7:
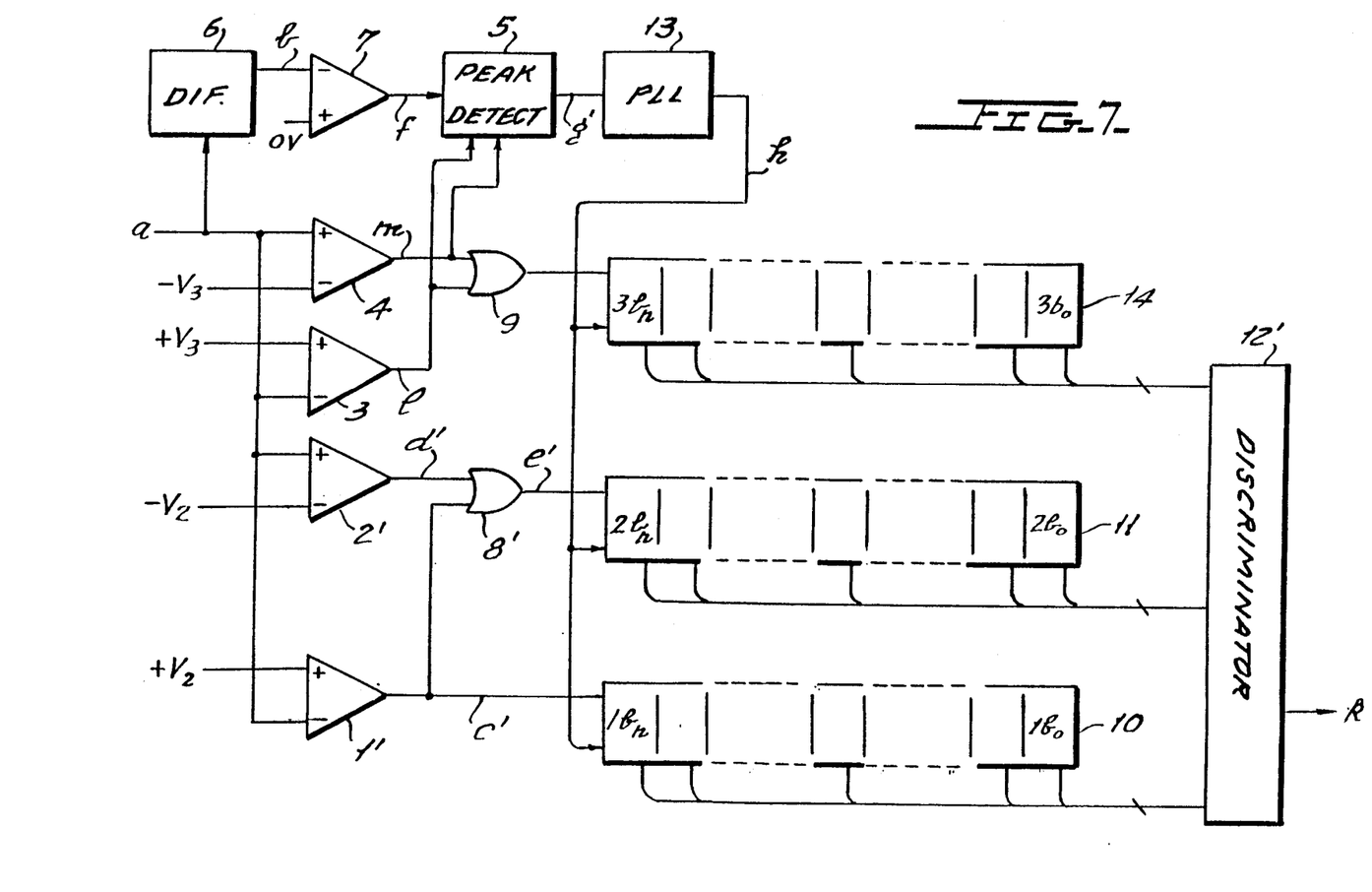
FIG. 7 is a schematic block diagram showing a second embodiment of the present invention.

FIG. 7 shows a second embodiment of the present invention. In the figure, similar components or structural elements are designated by the same reference numerals, and redundant description will be avoided for simplicity.

In FIG. 7, a first comparator 1' produces a level "H" when the positive amplitude of the reproduced analog signal a is higher than a threshold level $+V_2$, while a second comparator 2' produces a level "H" when the negative amplitude of the signal a is lower than a threshold level $-V_2$. The outputs of the comparators 1' and 2' are connected to a first OR gate 8'. The threshold levels $+V_2$ and $-V_2$ are smaller than the threshold levels +$V_1$ and −$V_1$ used in the first embodiment with respect to the absolute value.

A fourth comparator 3 produces "H" when the positive amplitude of the signal a is higher than a second threshold level +$V_3$, while a fifth comparator 4 produces "H" when the negative amplitude of the signal a is lower than a second threshold level −$V_3$. The outputs of the comparators 3 and 4 are connected to the peak detector 5 and a second OR gate 9. The threshold levels +$V_3$ and −$V_3$ are greater than the threshold levels +$V_1$ and −$V_1$ with respect to the absolute value.

A third shift register 14 is also implemented as a serial-in parallel-out shift register and has a serial input connecting to the output of the second OR gate 9. The output of the PLL 13 is connected to the shift clock h inputs of the shift registers 10, 11 and 14. The parallel outputs of shift registers 10, 11 and 14 are connected to a data discriminator 12' The bit length required of each of the shift registers 10, 11 and 14 is more than twice the largest interval between successive "1" produced by coding, plus 1 (one). For example, in the case of a recording system adopting a coding principle which allows "0" to continuously appear in only three bits at maximum, the required bit length will be nine or more bits.

As shown in FIG. 8, the first comparator 1' produces a positive low-level detection signal c' (FIG. 8c') by detecting the portions of the reproduced signal a which are higher than the first level +$V_2$. The second comparator 2' produces a negative low-level detection signal d' (FIG. 8d') by detecting the portions of the signal a which are lower than the first level −$V_2$. The fourth and fifth comparators 3 and 4 produce respectively positive and negative high-level signal 1 and m, as shown in FIGS. 8l and 8m.

Figure 8A:
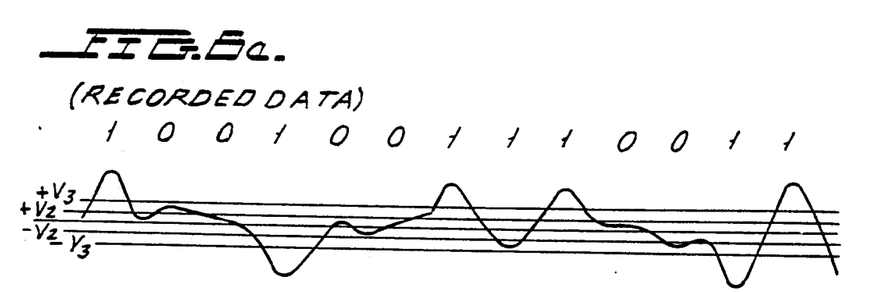
FIG. 8 is a timing chart representative of the operation of the second embodiment shown in FIG. 7.
Figure 8B:
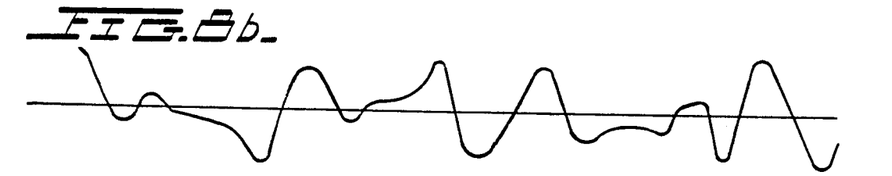
Figure 8C:
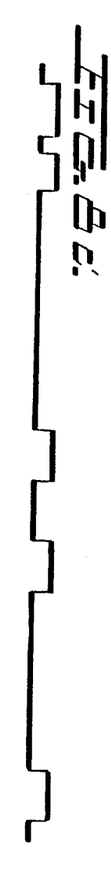
Figure 8D:
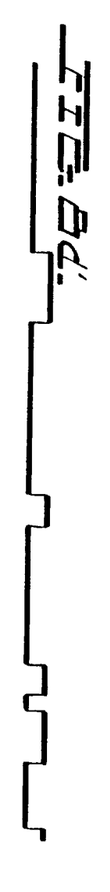
Figure 8E:
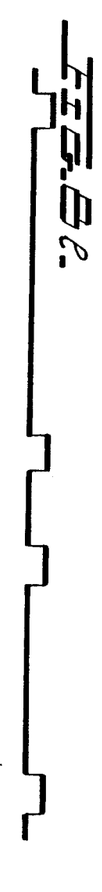
Figure 8F:
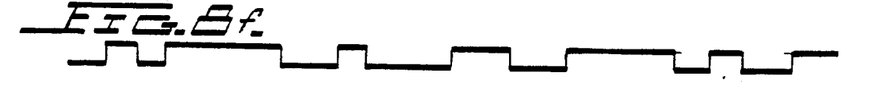
Figure 8G:
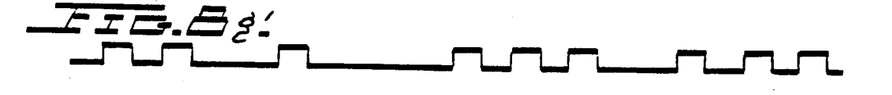
Figure 8H:
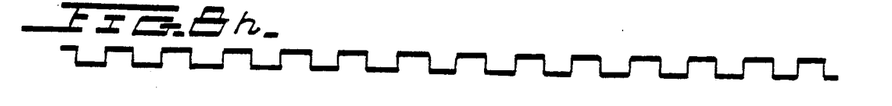
Figure 8M:
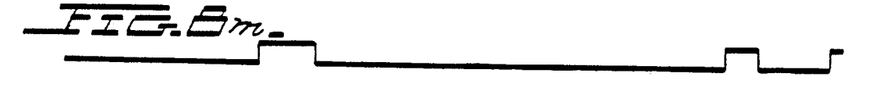

The comparator 7 shown in FIG. 7 outputs a signal shown in FIG. 8f by comparing the differentiated signal b with zero volt. The peak detector 5 produces a peak detection signal g' shown in FIG. 8g' on the basis of the outputs of the third to fifth comparators 7, 3 and 4, respectively. Supplied with the peak detection signal g', the PLL 13 produces a clock signal h, the positive-going edges of which are phase-locked to those of the signal g', as shown in FIG. 8h.

The first shift register 10 stores the positive low-level detection signal c' at the positive-going edges of the clock h while sequentially shifting it. By referencing an output of the shift register 10, the data discriminator 12' determines whether a peak existing in the bit cell has positive polarity or negative polarity. The second shift register 11 stores an output e' of the OR gate 8' (OR of the positive and negative low-level signals c' and d') at the positive-going edges of the clock h while sequentially shifting it. Based on the signal e', the data discriminator 12' determines whether the amplitude of the peak in the bit cell exceeds the first level +$V_2$ or −$V_2$.

The third shift register 14 stores the output of the OR gate 9 (OR of the positive and negative high-level detection signals 1 and m) at the positive-going edges of the clock h while sequentially shifting it. This signal allows the data discriminator 12' to see if the amplitude of the peak existing in the bit cell exceeds the second level +$V_3$ or −$V_3$.

The data discriminator 12' determines a bit cell wherein the peak of the signal a exceeds the second level +$V_3$ or −$V_3$ to be data "1", on the basis of the contents of the third shift register 14. The data discriminator 12' also determines, on the basis of the contents of the second and third shift registers 11 and 14, that a bit cell wherein the peak has an amplitude exceeding the first level +$V_2$ or −$V_2$ but short of the second level +$V_3$ or −$V_3$ is a candidate of data "1". Further, the data discriminator 12' regards that a bit cell wherein the content of the second register 11 is "L" is data "0".

Figure 9:
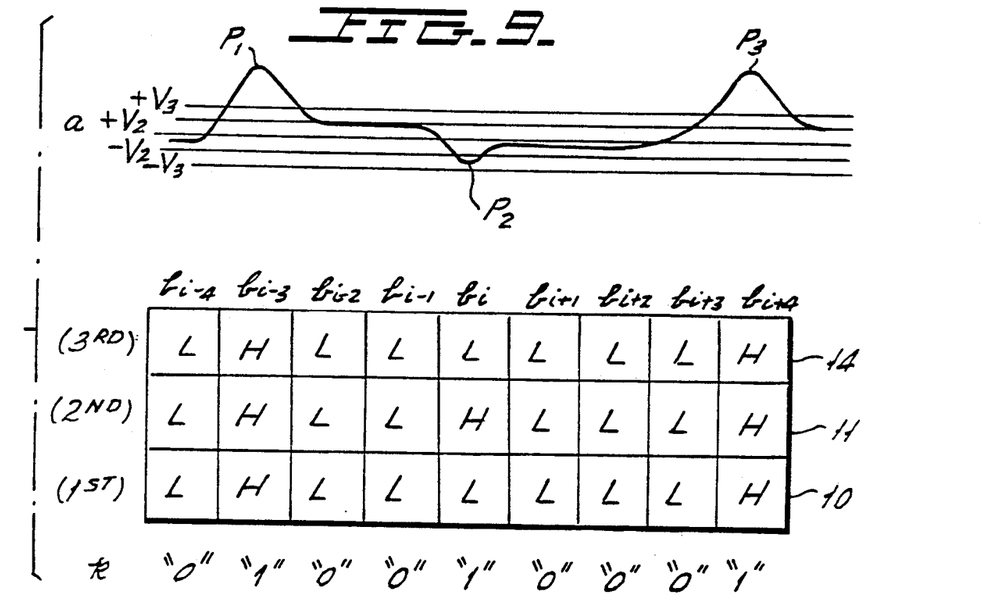
FIGS. 9 and 10 are diagrams useful for understanding the operation of the second embodiment shown in FIG. 7.

In the example shown in FIG. 9, the signal a has a peak $P_2$ which exceeds the first level −$V_2$ but is short of the second level −$V_3$. In this instance, positive peaks $P_1$ and $P_3$ each exceeding the second level +$V_3$ exist before and after the peak $P_2$ with respect to time. In general, digital magnetic recording is accomplished by associating the reversal points of polarity with data so that a transition from S to N, for example, is necessarily followed by a transition from N to S. Henve, a recovered analog signal associated with such transitions alternates. It follows that the peak $P_2$ can be regarded as a signal representative of data "1" the amplitude of which has deteriorated.

As stated above, in the illustrative embodiment, the data-reproducing circuit stores the transitions of reproduced amplitude on a bit cell basis so that even a peak which satisfies the above-described conditions but does not exceed the second level $V_3$ is interpreted as data "1" by referencing the preceding and following amplitude data as well as polarity data.

The decision on the bit $b_i$ as to "1"/"0" will be described in more detail. The contents of the bits $b_i$ of the first to third shift registers 10, 11 and 14 indicate that the peak $P_2$ is representative of a negative pulse whose amplitude is too small for the pulse to represent data "1". To determine whether the bit $b_i$ is data "1" or noise, the bits preceding and following it with respect to time are observed. On the basis of the contents stored in the bits $b_{i-3}$ of the shift registers 10, 11 and 14, it is seen that the peak $P_1$ has a sufficiently large positive amplitude. It is also seen that a signal having a sufficiently large positive amplitude exists in the bit $b_{i+4}$ also, based on the contents of the shift registers 10, 11 and 14. The data discriminator 12' therefore regards the peak in the bit $b_i$ as data "1" and produces digit data k.

Figure 10:
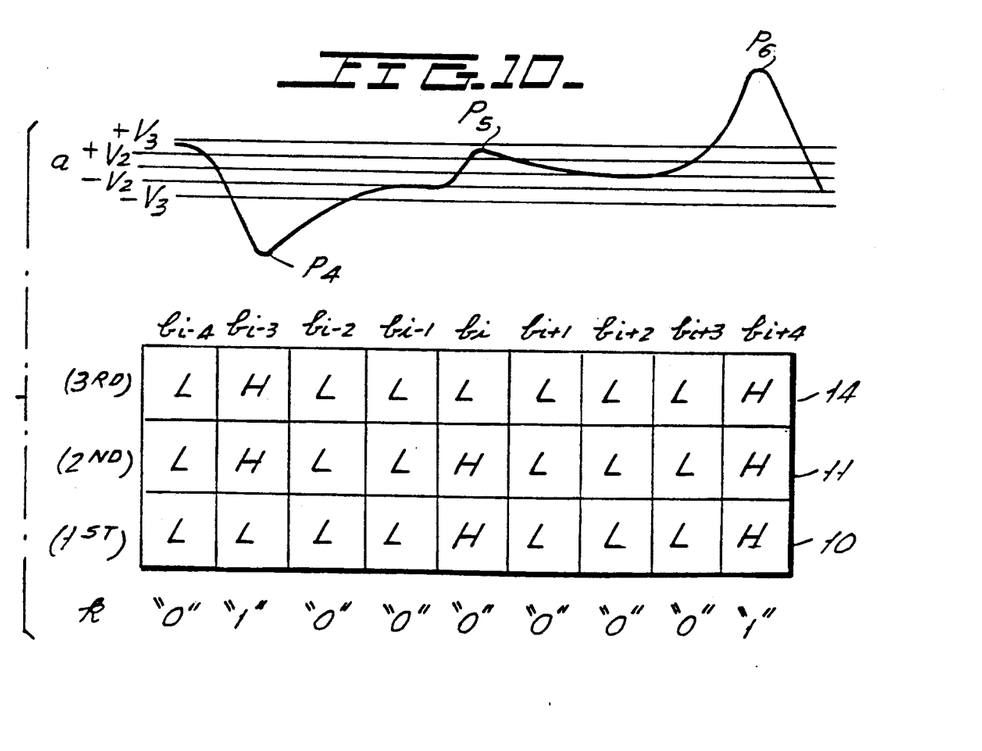

FIG. 10 shows another example of the reproduced signal a useful for understanding the above procedure. In the figure, let the bit $b_i$ be the bit of interest. The contents of the bits $b_i$ of the respective shift registers 10, 11 and 14 indicate that a peak $P_5$ is a positive signal whose amplitude is not sufficiently large as that of data "0". Observing the contents of the shift registers 10, 11 and 14 following the bit $b_i$ with respect to time, a peak $P_6$ has an amplitude which is high enough to be regarded as data "1". It is therefore seen that the peaks $P_5$ and $P_6$ have the same polarity, and that the peak $P_5$ does not represent data "1". Further, observing the bit $b_{i-3}$, it is seen that a peak $P_4$ has a sufficient negative amplitude. In this condition, the data discriminator 12' determines that the peak $P_5$ is noise that occurred between the peaks $P_4$ and $P_6$, and thereby produces data "0".

In this manner, the data discriminator 12' references those bits of the shift registers 10, 11 and 14 which are associated with a point where a signal exists and, when predetermined conditions for decision are satisfied, produces data "1". This prevents a peak representative of data "1" but having somewhat lowered amplitude from being neglected.

Figure 11:
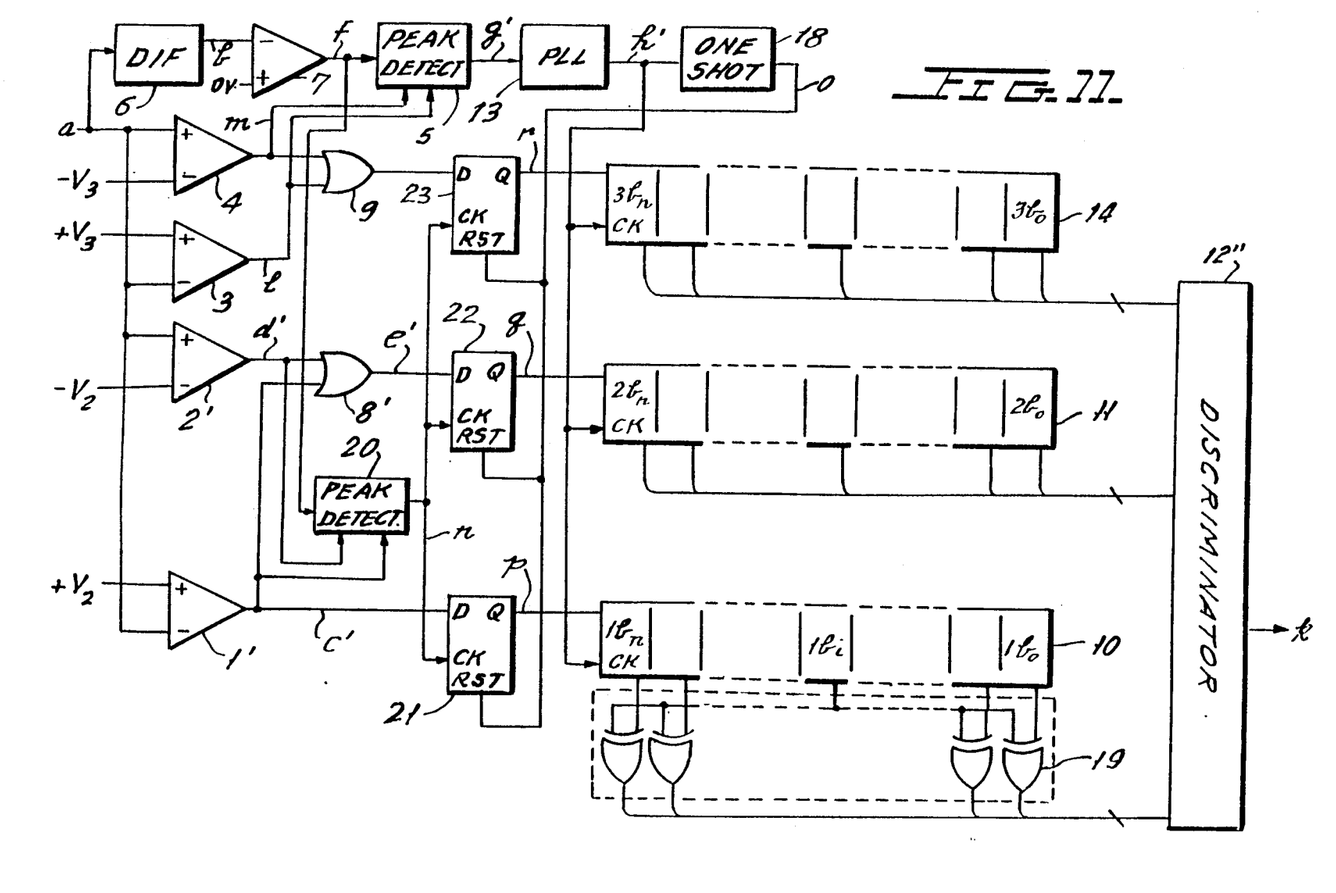
FIG. 11 is a schematic block diagram showing a third embodiment of the present invention.

FIG. 11, shows a third embodiment of the present invention. In the figures, similar components and structural elements are designated by the same reference numerals, and redundant description will be avoided for simplicity.

In FIG. 11, the output c' of the first comparator 1', the output e' of the first OR gate 8' and the output of the second OR gate 9 are connected to D terminals of first, second and third D type flip-flops 21, 22 and 23, respectively. A second peak detector 20 is supplied with the outputs c', d' and f of the first, second and third comparators 1', 2'and 7. The peak detector 20 has an output connecting to clock terminals CK of flip-flops 21, 22 and 23. The PLL 13 produces a clock signal h', the negative-going edges of which are synchronous to the positive-going edges of the output g' of the peak detector 5. Specifically, the negative-going edges of the clock h' are associated with the peaks of the reproduced signal a, and one period between consecutive positive-going edges defines one bit cell. The clock h' from the PLL 13 is fed to a one-shot circuit 18. The one-shot circuit 18 produces an output o which is slightly delayed in phase relative to the positive-going edges of the output h' of the PLL 13. The signal o is applied to reset terminals RST of the flip-flops 21, 22 and 23. Outputs p, q and r appearing on Q terminals of the flip-flops 21, 22 and 23, respectively, are delivered to the first, second and third shift registers 10, 11 and 14, respectively.

The parallel outputs of the first shift register 10 are connected to a data discriminator 12"by way of an Exclusive-OR (EX-OR) gate group 19. The EX-OR gates constituting the group 19 have one input connecting to the parallel outputs of the first shift register 10 except for the center bit $b_i$ of the latter, and the other input connecting to the center bit $b_i$. In this configuration, each EX-OR gate produces a level "H" only when data different from the data of the bit $b_i$ of interest is applied thereto.

How each level signal is taken in will be described with reference also made to FIG. 12. The second D type flip-flop 22 holds the output e' of the first OR gate 8' at positive-going edges of the output n of the peak detector 20, thereby producing a signal shown in FIG. 12q. The second shift register 11 takes in the signal n in synchronism with positive-going edges of the clock h' (trailing edge of bit cell) while sequentially shifting it. Based on the content of the shift register 11 the discriminator 12" can determine whether the peak has an amplitude which exceeds the first level $V_2$.

Figure 12A:
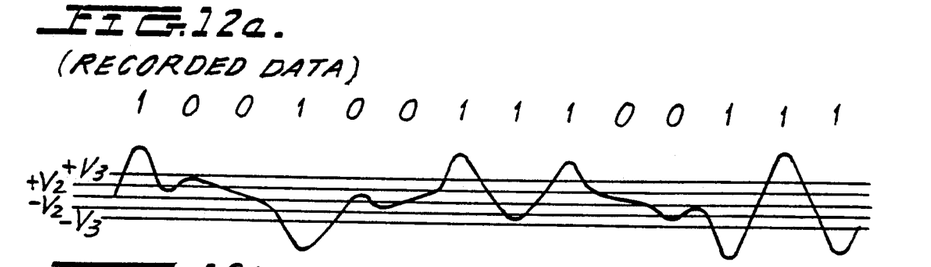
FIG. 12 is a timing chart demonstrating the operation of the third embodiment shown in FIG. 11.
Figure 12B:
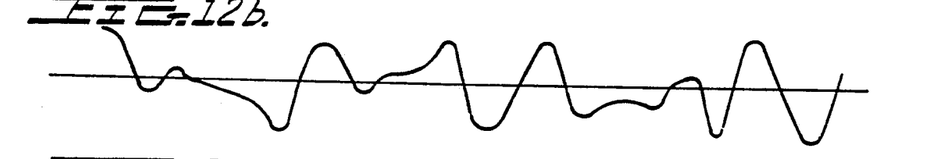
Figure 12C:
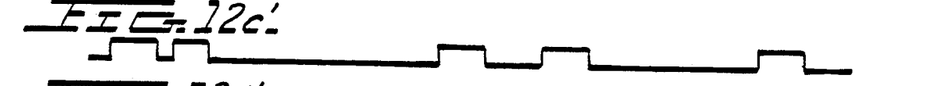
Figures 12D, 12L:
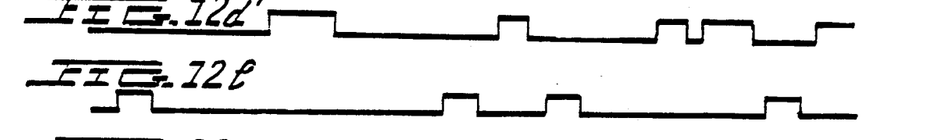
Figures 12F, 12M:
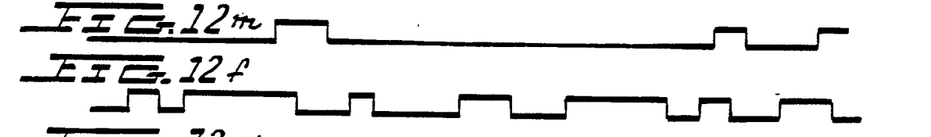
Figure 12G:
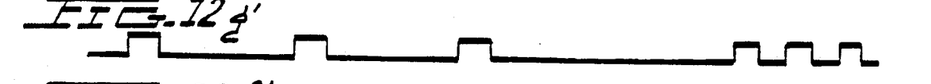
Figure 12K:
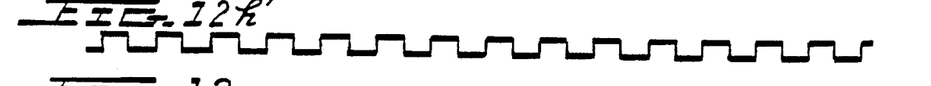
Figure 12N:
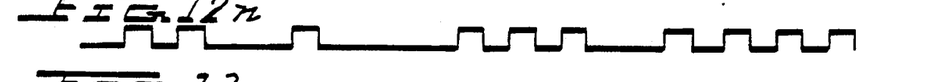
Figure 12O:
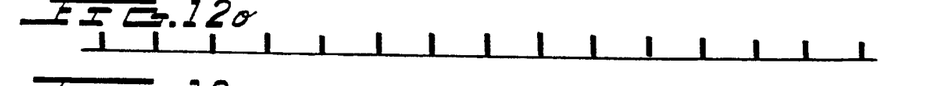
Figures 12P, 12Q:
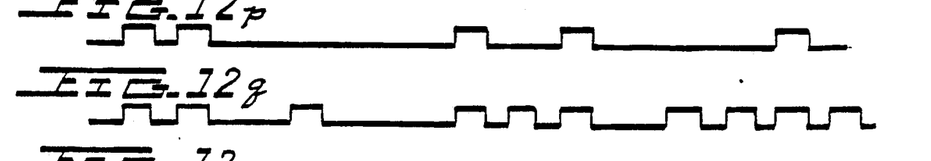
Figure 12R:
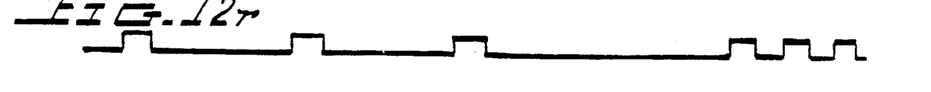

The third D-type flip-flop 23 holds the output of the second OR gate 9 (i.e., OR of the positive high-level detection signal 1 and negative high-level detection signal m) at the positive-going edges of the output n of the peak detector 20, thereby producing a signal shown in FIG. 12r. The third shift register 14 takes in the signal r in synchronism with the positive-going edges of the clock h' while sequentially shifting it. Based on the content of the shift register 14, the discriminator 12" can determine whether the peak has an amplitude which exceeds the second level $V_3$.

The first D type flip-flop 21 takes in and holds the positive low-level detection signal c' at positive-going edge of the output n of the peak detector 20, thereby producing a signal p shown in FIG. 12p. The first shift register 10 takes in the signal p at a positive-going edge of the clock h' while shifting it. The data discriminator 12" determines whether the peak is positive or negative on the basis of an output of the shift register 10. The EX-OR gate group 19 compares the center bit $b_i$ of the first shift register 10, i.e., the bit to be decided as to "1"/"0" with the other bits, producing "0" if they compare equal in polarity, and "1" if otherwise. This allows the data discriminator 12" to readily determine whether or not the center bit $b_i$ and the other bits of the shift register 10 are opposite in polarity. The data discriminator 12" is operated in the same manner as described with reference to FIGS. 9 and 10, and details thereof will not be described to avoid redundancy.

In summary, it will be seen that the present invention provides an intelligent data-reproducing circuit that reduces the loads on error-checking and error-correcting circuits of the kind using a parity check code or similar redundant code, thereby reproducing data efficiently and accurately. These advantages of the present invention are derived from a unique procedure wherein a characteristic of a reproduced analog signal waveform is stored in the form of a digital value and, when a signal which is difficult to decide as to data/noise appears, amplitudes around such a signal are referenced to reproduce more correct data.

What is claimed is:

1. A data reproducing circuit comprising:
   a first comparator for determining when a positive amplitude of a reproduced analog signal exceeds a positive first level;
   a second comparator for determining when a negative amplitude of said reproduced analog signal exceeds a negative first level;
   a clock-generating circuit for generating clock signal phase-locked to timings of positive and negative peaks of said reproduced analog signal;
   a first shift register having a plurality of first bit cells for receiving an output of said first comparator in response to said clock signal and for shifting and storing said output so that each of said first bit cells indicates a first or second state showing whether or not said reproduced analog signal exceeds said positive first level at a respective clock timing of said clock signal;
   an OR gate for generating an OR signal responsive to outputs of said first and second comparators;
   a second shift register having a plurality of second bit cells for receiving said OR signal in response to said clock signal and for shifting and storing said OR signal so that each of said second bit cells indicates a third or fourth state showing whether or not said reproduced analog signal exceeds any of said positive first level and negative first level at a respective clock timing of said clock signal; and
   a discriminator for producing digital data consisting of high and low states from parallel outputs of said first and second shift registers by detecting a target bit having first and second target bit cells included in said first and second bit cells, respectively, and a reference bit having first and second reference bit cells included in said first and second bit cells, respectively, said second target bit cell and said second reference bit cell indicating said third state, and said reference bit being selected from bits preceding or succeeding said target bit by detecting said second reference bit cell indicating said third state which is closest to said second target bit cell with respect to time in said second shift register, and discriminator determining said target bit as said high state of said digital data when said first target bit cell and said first reference bit cell indicate opposite states, and determining said target bit as said low state when said first target bit cell and said first reference bit cell indicate the same state.

2. A circuit as claimed in claim 1, wherein said clock generating circuit includes:
- a differentiator for producing a differentiated signal by differentiating said reproduced analog signal;
- a third comparator for producing a differentiated-level detection signal by detecting positive and negative levels of said differented signal;
- a peak detector for producing a peak detection signal on the basis of said differentiated-level detection signal; and
- a phase-locked loop circuit for generating said clock signal in synchronism with said peak detection signal.

3. A circuit as claimed in claim 1, further comprising:
- a fourth comparator for determining when a positive amplitude of said reproduced analog signal exceeds a second positive level which is higher than said first positive level;
- a fifth comparator for determining when a negative amplitude of said reproduced analog signal exceeds a second negative level which is lower than said first negative level;
- an OR gate for producing an OR signal responsive to outputs of said fourth comparator and said fifth comparator; and
- a third shift register for receiving said OR signal in response to the clock signal and for shifting and storing said OR signal;
- said discriminator producing the digital data by referencing a parallel output of said third shift register as well as the outputs of said first and second shift registers.

4. A circuit as claimed in claim 1, further comprising:
- a first flip-flop receiving an output of said first comparator and feeding its output to said first shift register;
- a second flip-flop receiving said OR signal of said first and second comparators and feeding its output to said second shift register; and
- a one-shot circuit for resetting said first and second flip-flops in response to said clock signal.

* * * * *